United States Patent [19]
Engelking

[11] 3,728,900
[45] Apr. 24, 1973

[54] UNIVERSAL NUTATION DAMPER

[75] Inventor: Uwe K. Engelking, Domeinweg Noordwijk, Netherlands

[73] Assignee: Organisation Europeenne de Recherches Spatiales, Neuilly-sur-Seine, France

[22] Filed: Mar. 30, 1971

[21] Appl. No.: 129,330

[30] Foreign Application Priority Data

Ap. 2, 1970 Belgium..................................87299

[52] U.S. Cl....................................74/5.5, 244/1 SA
[51] Int. Cl..............................................B64c 17/02
[58] Field of Search......................244/1 SA; 74/5.5; 33/226 R; 73/430

[56] References Cited

UNITED STATES PATENTS 3,363,856  1/1968  Tossman et al.....................244/1 SA
3,426,980  2/1969  Caggiano et al......................74/5.5 X
2,534,963  12/1950  Fowler.....................................74/5.5
2,592,092  4/1952  Wechsler..................................74/5.5
3,249,321  5/1966  Newkirk et al......................244/1 SA
3,442,468  5/1969  Iorillo....................................244/1 SA

FOREIGN PATENTS OR APPLICATIONS 204,276  9/1939  Switzerland.............................73/430

*Primary Examiner*—Manuel A. Antonakas
*Attorney*—Burgess, Ryan & Wayne

[57] ABSTRACT

A stabilization device to keep the nutation of a gyroscopic system, e.g., a spinning spacecraft or space vehicle, comprising an arcuate guide, a gas, liquid and/or solid component contained in said guide and adapted to move therein while dissipating energy, said movement being in a plane making an acute angle with the spin axis of said gyroscopic system.

5 Claims, 4 Drawing Figures

UNIVERSAL NUTATION DAMPER

FIELD OF THE INVENTION.

The present invention generally relates to the stabilization of gyroscopic systems and more particularly to the damping of the nutation of spinning spacecrafts or space vehicles.

BACKGROUND OF THE INVENTION.

The nutation is defined as the movement of a spacecraft or space vehicle's spin axis on a cone around the vector moment of momentum. The angle between the spin axis (which coincides with the principal axis of the largest moment of inertia) and the vector moment of momentum is the nutation angle.

If no external torques are applied this vector remains unchanged in magnitude and attitude. Therefore nutation about a space fixed direction coinciding with the vector moment of momentum will be observed after the spacecraft has been submitted to external torques, for instance after operations intended to adjust the attitude of the spacecraft or after perturbation torques caused by separation of the spacecraft from the last stage of the rocket. This nutational movement can persist continuously so that the satellite has no body fixed axis which is also fixed in space.

Now a satellite has to fulfil a mission and at least one body fixed axis should have a well determined orientation in space. For spinning spacecrafts this would be the spin axis if it is possible to reduce the nutation angle by damping to zero as closely as possible. Otherwise the spacecraft's mission may be hampered or even result in a complete failure.

Several devices are known whose purpose is to damp the nutation. Such devices produce a dissipation of the spacecraft rotational energy. They generally comprise an arcuate tube in which a gas, liquid and/or solid component is enclosed. Among the several possible combinations, a typical device includes a solid ball within a tube containing a gas. The ball oscillates during the nutation movement of the spacecraft and some energy is being dissipated through gas friction. This dissipated energy is equivalent to a loss of rotational energy and, theoretically that loss can be such that the nutation is being neutralized. In practice, the moving masses are being stopped on account of friction before this condition is reached: thus there always remains a residual nutation angle. Ball devices can be provided in two types.

In the first one, the plane of the tube in which the ball moves is located within a meridian plane of the spacecraft, and the device is said to be of the meridian type. In the second type, the plane of the tube is located in a plane parallel to the equatorial plane, the plane of which contains the mass center of the spacecraft and the device is said to be of the equatorial type. Selection of the type depends on practical considerations which are beyond the scope of the invention. It will be merely pointed out that the meridian type is usually preferred for it has higher performance (lower time constant and lower residual nutation angle) compared with the equatorial type of equivalent size and that it requires less tube protection only regarding vibrations during launching of the rocket. Caging or fixing of the ball during launch is in most cases not necessary if a meridian type is used.

These known devices, whatever the type may be, must be adapted to the spacecrafts for which they are intended to be used. For this purpose heretofore a suitable curvature radius for the tube must be selected according to some parameters of the spacecraft, including the lateral moment of inertia of the spacecraft, its moment of inertia about the spin axis of the spacecraft and the distance between the tube and the spin axis of the spacecraft. This adaptation is unique for each particular spacecraft, i.e., for each case the curvature radius of the tube must have a determined particular value. At times, it may happen that the required value for the curvature radius is too great for manufacturing a meridian type device; then one is reduced to using an equatorial type device in spite of its drawbacks.

It is apparent that the requirement for a nutation damper which is proper to each spacecraft leads to a high cost. Substantial savings could obviously be gained by providing a standard nutation damper that could be used for all spacecrafts of a certain size, for instance for all small satellites.

SUMMARY OF THE INVENTION.

The foregoing problem is solved by the present invention which provides an universal stabilization device to damp the nutation of a gyroscopic system, for instance a spacecraft or space vehicle.

The stabilization device for damping the nutation of a gyroscopic system having a spin axis, according to the invention, comprises an arcuate guide having a fixed radius of curvature, a gas, liquid and/or solid component contained in said guide and adapted to move therein while dissipating energy, said movement being in a plane making an acute angle with the spin axis of said gyroscopic system.

The same device can be adapted to each particular case by selecting an appropriate value for the inclination angle, said value always lying between 0° and 90°, exclusive of said limits.

In ball-type embodiments used on spacecrafts or space vehicles, for instance, wherein the inclination angle is restricted to values between 0° and about 45° it is not necessary — in most cases — to cage or fix the ball during launch, inasmuch as the ball is kept at one end of the tube while the rocket is accelerating. Therefore the sensitive middle part of the tube, of which the surface finish is decisive for the residual nutation angle, cannot be damaged by the ball when mechanical vibration are caused by the rocket engine.

The arrangement according to the invention not only permits the cost of nutation damper devices to be reduced owing to a possible standardized manufacturing, but it assures higher performance than an equatorial type device which had to be adopted in some cases where, on account of manufacturing reasons, the appropriate meridian type device could not be used. Furthermore, the universal damper according to the invention assures generally lower residual nutation angle and lower time constant than an equatorial type device of equivalent size and it is less sensitive than that latter one to assembly errors.

DETAILED DESCRIPTION

Figure 1:
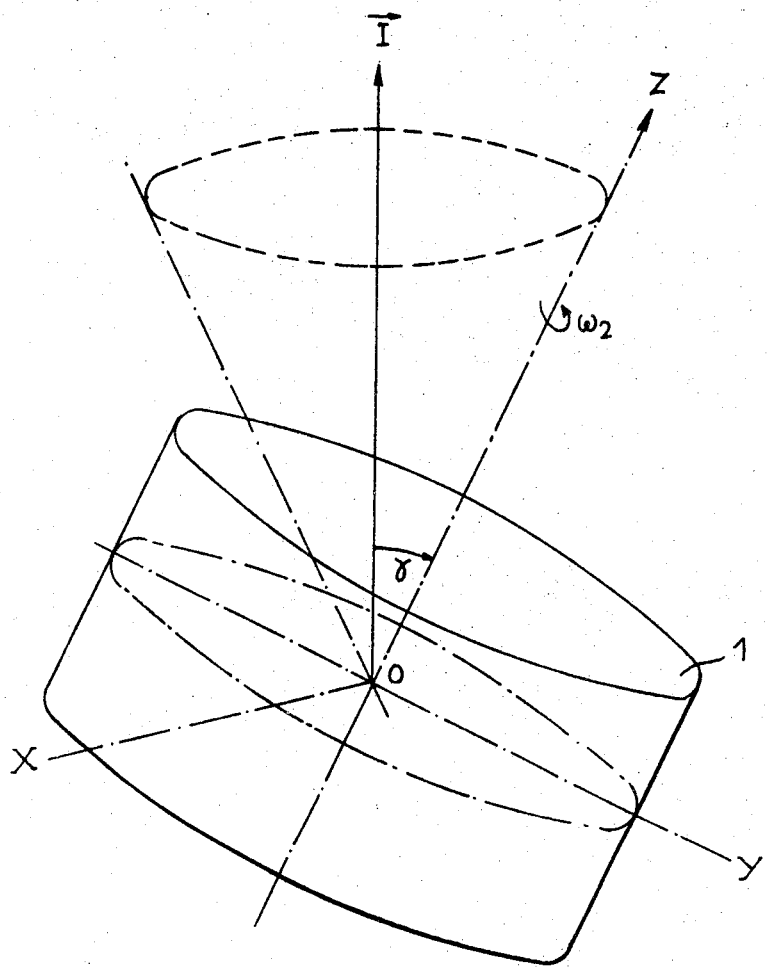
FIG. 1 illustrates the nutation movement of a spacecraft.

Referring to FIG. 1 there is illustrated the nutation movement of the spin axis OZ of a spacecraft or space vehicle 1 when the vector moment of momentum I does not coincide with the spin axis. As mentioned above the nutation angle $\gamma$ is the angle between vector I and the OZ axis. The larger the angle $\gamma$, the larger the rotational energy. Therefore dissipating of the rotational energy by a suitable damper device will result in a reduction of the nutation angle.

Figure 2:
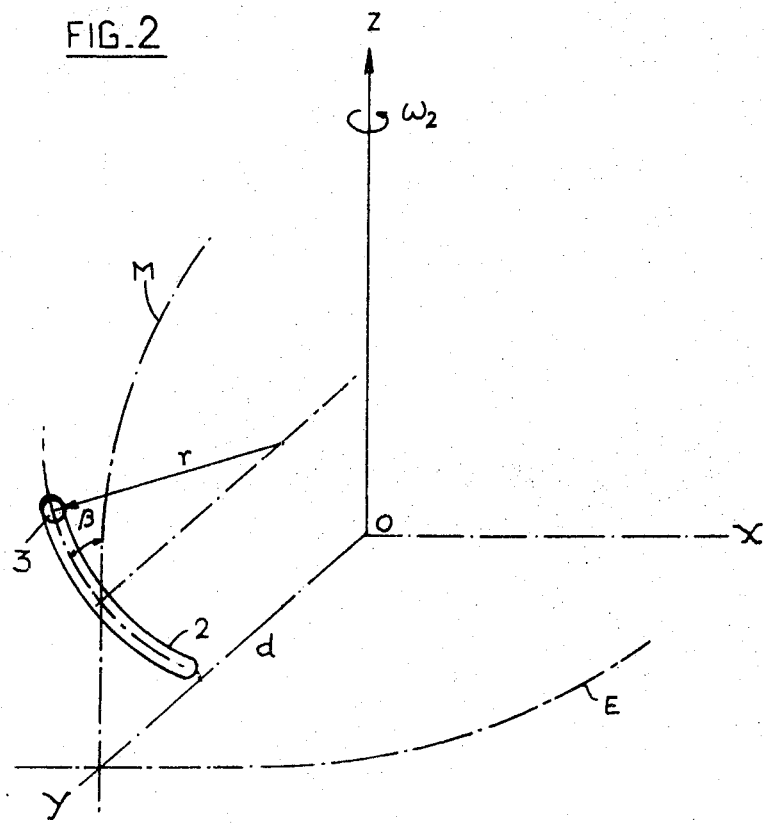
FIG. 2 schematically illustrates one arrangement of an universal device according to the invention.

FIG. 2 schematically illustrates one arrangement of the universal damper device according to the invention. In the figure there is shown the reference trihedral OXYZ linked to the vehicle. The OZ axis is the vehicle spin axis, M is a meridian plane and E is the equatorial plane of this vehicle. The device comprises an arcuate tube 2 and/or any suitable liquid as well as a solid ball component 3. Usually the tube 2 was and must be located either in the meridian plane M or in a plane parallel to equatorial plane E. Then the tube must have a determined radius $r$ in order that the device by perfectly adapted to the spacecraft. This adaptation is rather inconvenient and is seriously impaired by assembly errors which lead to deviations of the tube with respect to plane M or plane E.

According to the invention, the tube 2 is arranged in such a way that the relative movement of ball 3 with respect to the fluid makes an acute angle $\beta$ having a appropriate value with the spin axis OZ. The plane of the tube containing its curvilinear axis also makes an acute angle $\beta$ with the OZ axis. In the example of FIG. 2 the tangent at the vertex of tube 2 is perpendicular to the intersection of the equatorial plane with the said plane containing the curvilinear axis. The value of said inclination angle $\beta$ is connected to certain mechanical parameters of the vehicle as will be shown hereinafter. The value of said inclination angle $\beta$ lies between 0° and 90°, exclusive of said limits.

It has been found that when the moment of inertia of both lateral principal axes (being orthogonal to the spin axis) are equal and when a ball is used as the solid component, then tuning of the damper device will be achieved by associating the inclination angle 62, the curvature radius $r$ of tube 2, the distance $d$ between tube 2 and spin axis OZ of the vehicle, and the moment of lateral inertia $\Theta_L$ of the vehicle by the following equation:

$$5/7\,[d/r - \sin^2\beta] - [(\Theta_z - \Theta_L)/\Theta_L]^2 = 0$$

where $\Theta_z$ is the spin moment of inertia and $\Theta_L$ is the lateral moment of inertia.

Figure 3:
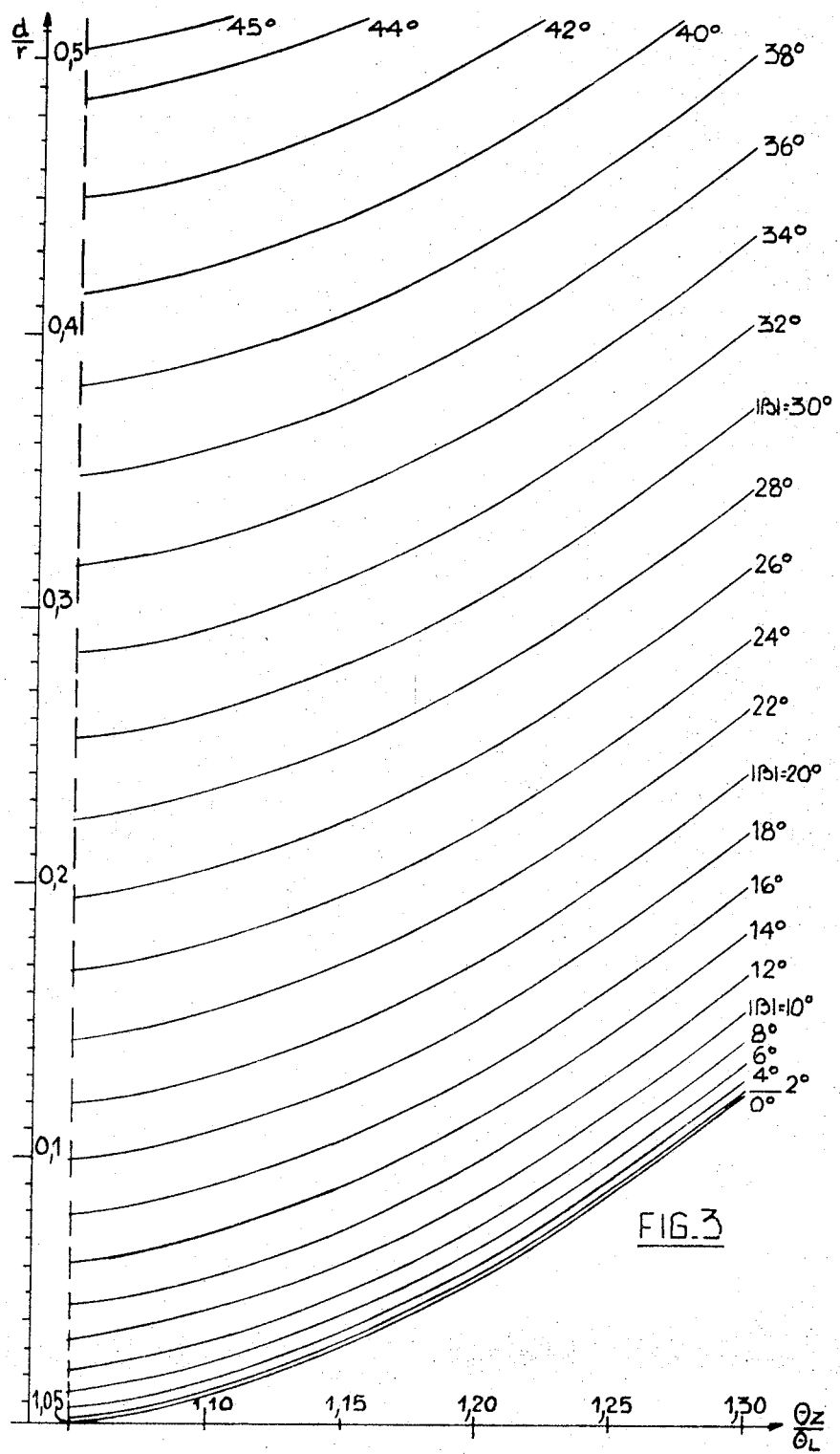
FIG. 3 shows typical curves for a ball type device indicating the relationship between the inclination angle of the universal device according to the invention and mechanical parameters of the gyroscopic system to which it is intended to be adapted.

This equation is illustrated by the graph of FIG. 3 that shows ratio $\Theta_z/\Theta_L$ as abscissae and ratio $d/r$ as ordinates. For every combination of values for $d/r$ and $\Theta_z/\Theta_L$, FIG. 3 gives a value for the inclination angle $\beta$ for which the damper device will be tuned and consequently properly adapted to the vehicle. For a given value for ratio $\Theta_z/\Theta_L$ (characteristical value for the vehicle) then it is possible to have a damper device having a fixed curvature radius adaptable for a determined range of values for distance $d$, i.e., for a series of vehicles whose sizes lie within a determined range, for instance small satellites.

In a preferred embodiment of the device of the invention, the inclination angle $\beta$ is limited to a value lying between 0° and 45° approximately in order to avoid temporary caging of the ball during launch as discussed above. FIG. 3 shows the curves for the $\beta$ values corresponding to this preferred but not limitative embodiment.

The adaptation range of the universal damper according to the invention will be illustrated hereinafter by means of an example. It will be assumed that:

$$1.05 < \Theta_z/\Theta_L < 1.25$$

FIG. 3 shows that, in this case:

$$0.088 < d/r < 0.5$$

Assuming a minimum value for $d$ as follows:

$$d_{min} = 0.2\ m$$

the maximum value will be:

$$d_{max} + [(d/r)\,\text{max}/(d/r)\,\text{min}] \cdot d_{min} = (0.5/0.088) \times 0.2$$
$$\approx 1.10\ m$$

The above conditions may be met by means of a tube having a curvature radius of:

$$r = (r/d) \cdot d = 2.20\ m$$

By using one and the same tube, it is possible to damp the nutation of a large number of gyroscopic systems by suitably selecting the value for the inclination angle $\beta$.

It can also be seen in FIG. 3 that by using a moderate inclination angle $\beta$ (between 0° and about 30°) it is possible to have for ratio $d/r$ a low value which permits obtaining performance equivalent to a meridian type damper even for a system which would not allow a meridian type damper to be adapted because of difficulties to manufacture tubes having a curvature radius above 5m with a sufficient accuracy.

It has been found that besides its equivalent performance to a meridian type damper, that is higher than an equatorial type device, the universal damper of the invention is also less sensitive to assembly errors (deviation of the inclination angle with respect to its rated value) than an equatorial type damper.

It is apparent from the foregoing that the invention provides a stabilization device that permits solving in an inexpensive and efficient way the problem of damping the nutation movement of gyroscopic systems and notably the nutation of spacecrafts and space vehicles.

Figure 4:
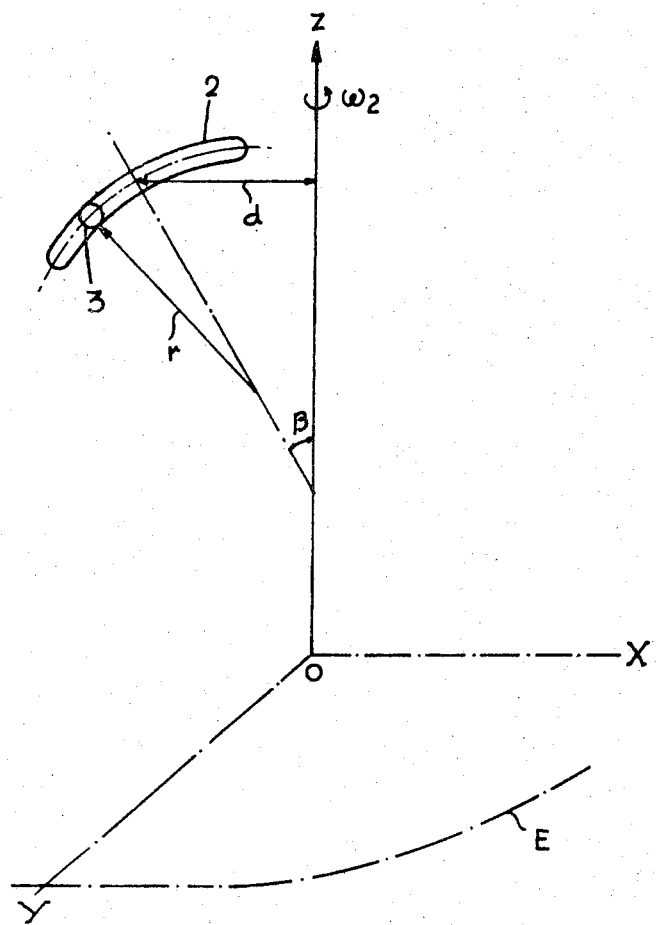
FIG. 4 schematically illustrates another arrangement for the device of the invention.

It is to be understood that the described embodiment is nowise limitative and that the invention may be applied to any gyroscopic system. Furthermore, changes can be devised by those skilled in the art without departing from the scope and spirit of the invention. A variant is illustrated by way of example in FIG. 4. There is shown arcuate 2 containing a fluid with a ball 3 adapted to move therein, which is arranged such that the tangent at the vertex of tube 2 is parallel to the intersection of the equatorial plane with the inclined plane containing the curvilinear axis of the tube. It is apparent that similar to the embodiment of FIG. 2, the relative movement of the ball and the fluid is, according to the invention, in a plane making an acute angle $\beta$ with spin axis OZ.

What is claimed is:

1. In combination with a gyroscopic system having a spin axis which provides the center of a tetrahedron formed by three reference planes having quadrants therebetween, a stabilization device for damping the nutation of said system comprising:

an arcuate hollow tube associated with said system and located in a plane in one of said quadrants, said tube plane intersecting an adjacent reference plane at an acute angle of inclination;

a material substance contained in said tube and movable therein when the system nutates about said spin axis;

said acute angle of inclination being related to the ratio $d/r$ by the equation:

$$5/7 \ [d/r - \sin^2\beta] = [(\Theta_z - \Theta_L)/\Theta_L] \ 2 = 0$$

where $\beta$ is the acute angle of inclination, $\Theta_z$ is the spin moment of inertia, $\Theta_L$ is the lateral moment of inertia, $d$ is the distance between said tube and said spin axis, and $r$ is the radius of curvature of the tube.

2. The combination system according to claim 1 in which said acute angle is approximately in the range of 0° to 45°.

3. The combination system according to claim 1 in which said material substance comprises a gas component.

4. The combination system according to claim 1 in which said material substance comprises a liquid component.

5. The combination system according to claim 1 in which said material substance comprises a solid component.

* * * * *